C. C. HANSEN.
SHOT BIT.
APPLICATION FILED JULY 29, 1920.

1,406,185.

Patented Feb. 14, 1922.

INVENTOR
Charles C. Hansen.
BY
Herbert G. Ogden
ATTORNEY

UNITED STATES PATENT OFFICE.

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW YORK.

SHOT BIT.

1,406,185.

Specification of Letters Patent. Patented Feb. 14, 1922.

Application filed July 29, 1920. Serial No. 399,660.

*To all whom it may concern:*

Be it known that I, CHARLES C. HANSEN, a citizen of the United States, and a resident of Easton, county of Northampton, State of Pennsylvania, have invented certain new and useful Improvements in Shot Bits, of which the following is a specification.

This invention relates to shot bits, but more particularly to a shot bit for shallow drilling in such work as testing pavements or high-ways or other shallow testing in concrete and similar material.

Heretofore, the shot and water have been introduced around the outside of the drill bit but this has the disadvantage that a large part of the shot are lost through the action of centrifugal force, and the results have not been satisfactory.

The primary objects of the present invention are to overcome these disadvantages of the former method and enable the shot and water to be introduced into a chamber or cavity in the drill spindle head in a simple manner, and the centrifugal force of the rotating bit is utilized to carry the shot and water to the periphery of the chamber, which communicates at this point with the inside of the drill bit so that the shot and water are fed inside the drill bit to the cutting edge. The one preferred form of apparatus for carrying out the invention is illustrated in the accompanying drawings, in which—

Figure 1:
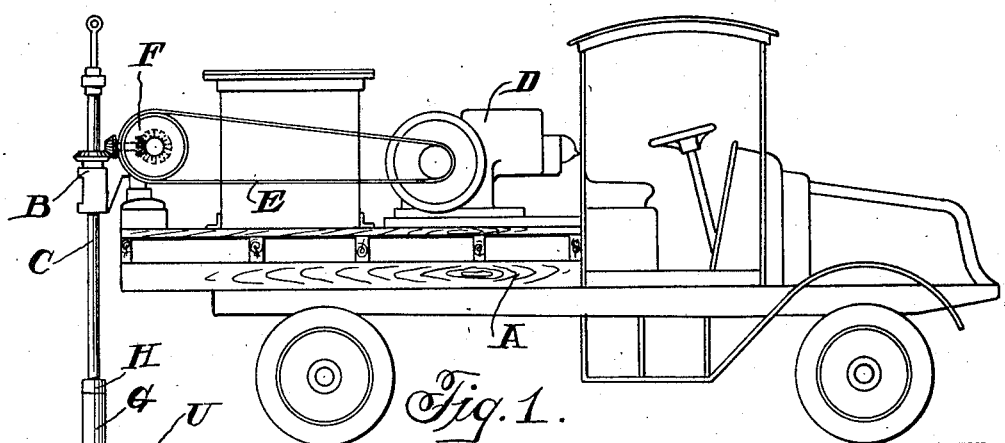
Figure 1 is a side elevation of a complete apparatus including a traveling carriage or truck on which the drilling machine is mounted.

Referring to the drawings, A represents a traveling carriage, in this instance a motor truck on which the drilling machine is mounted in any suitable or usual manner. The drill head B is mounted at the back of the truck and the vertically movable drill spindle C is adapted to be rotated from the motor D by means of the belt E and gearing F in the usual manner. These parts are shown diagrammatically for the sake of clearness.

Figure 2:
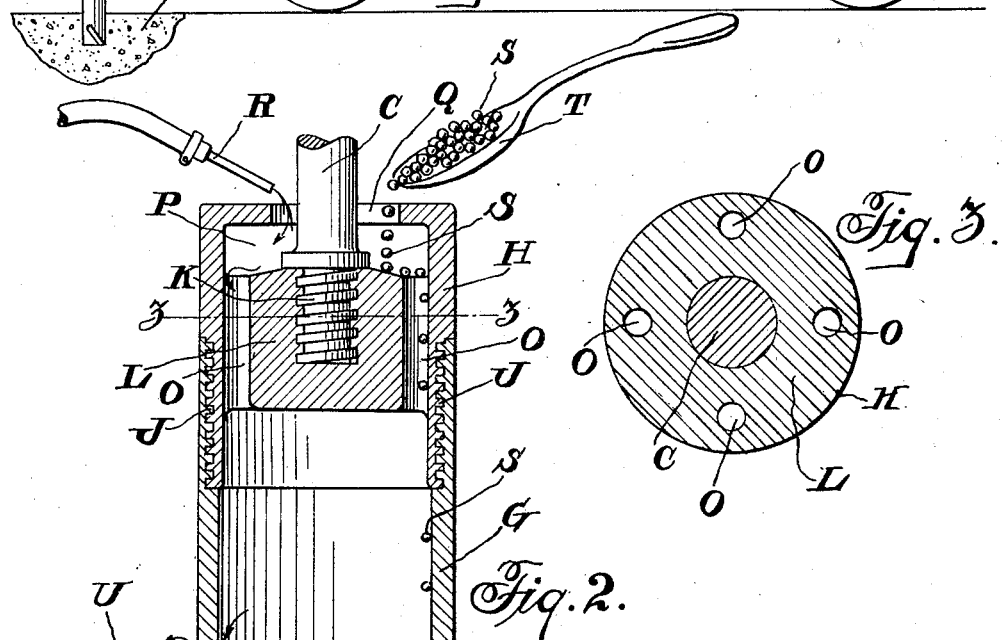
Figure 2 is an enlarged detail vertical sectional view taken through the shot bit.
Figure 3:
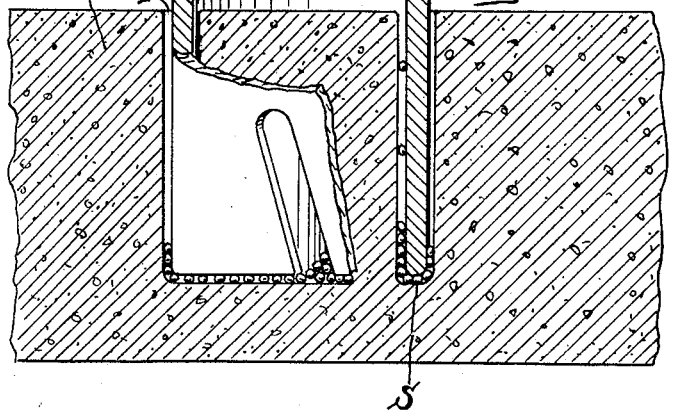
Figure 3 is a horizontal sectional view on the line 3—3 of Figure 2.

The cylindrical single walled drill bit or shot bit G shown in detail in Figure 2, in accordance with this invention is provided with a removable drill spindle head or plug H which may be conveniently screw threaded to the shot bit G as by means of the screw threads J. The drill spindle C may have a screw connection as shown at K with the web like integral central body portion L of the drill bit head H. The drill head H is cylindrical in form, its internal diameter being slightly less than that of the bit G, the cutting portion or bit G forming an enclosed bit casing.

A plurality of vertical longitudinal passages or holes O are provided in the body portion L or the drill bit head around the periphery inside the walls of the head and afford communication between a chamber or cavity P in the upper portion of the head and the inside of the drill bit. The chamber or cavity P has an opening Q at the top around the spindle C through which shot and water may be introduced directly from an outside source, in this instance the water being shown as supplied from the hose nozzle R and the shot S being poured from a spoon T or other suitable holder.

In the operation of the device, which is shown in the figures in use for testing a pavement or roadway U, the water and shot are introduced into the upper chamber or cavity P in the manner described and shown, and the centrifugal force, due to the rotation of the drill bit, carries the shot and water outwardly to the vertical holes or passages O through which the shot and water fall inside the drill bit to the lower chamber and around the interior surface of the cutting portion to the cutting edge. The drill bit has been found to operate satisfactorily and well, and forms a simple and convenient means for securing a core in making tests of comparatively shallow depth.

I claim:

1. A shot bit for core drills comprising a single walled cylindrical cutting portion, a head portion of the same external diameter removably secured thereto, the internal diameter of said head portion being slightly less than that of the cutting portion, said head portion having an integral central body portion to which the operating spindle is adapted to be secured, said body portion separating the interior of the bit into upper and lower chambers, and being provided with longitudinal passages at the outer sides connecting said chambers and the top of the drill head enclosing the upper chamber having a central opening around the spindle whereby the cutting material may be deposited in the upper chamber directly from an outside source and fed by centrifugal force through said longitudinal passages and around the interior surface of the cutting portion to the cutting edge.

2. A shot bit for core drills comprising a single walled cylindrical cutting portion, a cylindrical head portion removably secured thereto, said cutting portion and head portion forming an enclosed bit casing, said head portion having a weblike central body portion to which the operating spindle is adapted to be secured, said body portion separating the interior of the bit into upper and lower chambers, and being provided with circumferentially disposed longitudinal passages at the outer sides connecting said chambers, and the top of the drill head enclosing the upper chamber having a central opening around the spindle whereby the cutting material may be deposited in the upper chamber directly from an outside source and fed by centrifugal force to and through said longitudinal passages and into the lower chamber and then around the interior surface of the cutting portion to the cutting edge.

3. A shot bit for core drills comprising a single walled cylindrical cutting portion, a cylindrical head portion of the same external diameter removably secured thereto, said cutting portion and head portion forming an enclosed bit casing, the internal diameter of the head portion being slightly less than that of the cutting portion, said head portion having a weblike integral central body portion to which the operating spindle is adapted to be secured, said body portion separating the interior of the bit into upper and lower chambers, and being provided with a plurality of circumferentially disposed vertical longitudinal passages at the outer sides connecting said chambers, and the top of the drill head enclosing the upper chamber having a central opening around the spindle whereby the cutting material may be deposited in the upper chamber directly from an outside source and fed by centrifugal force to and through said longitudinal passages and into the lower chamber and then around the interior surface of the cutting portion to the cutting edge.

In testimony whereof I have signed this specification.

CHARLES C. HANSEN.